(12) United States Patent
Lee (10) Patent No.: US 7,893,710 B2
(45) Date of Patent: Feb. 22, 2011

(54) TERMINATION CIRCUIT AND IMPEDANCE MATCHING DEVICE INCLUDING THE SAME

(75) Inventor: Geun-Il Lee, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 12/494,394

(22) Filed: Jun. 30, 2009

(65) Prior Publication Data

US 2010/0308861 A1 Dec. 9, 2010

(30) Foreign Application Priority Data

Jun. 8, 2009 (KR) ................... 10-2009-0050486

(51) Int. Cl.
*H03K 17/16* (2006.01)
*H03K 19/003* (2006.01)
(52) U.S. Cl. ......................................... 326/30
(58) Field of Classification Search .................... 326/30
See application file for complete search history.

(56) References Cited

U.S. PATENT DOCUMENTS

| 6,292,014 | B1 * | 9/2001 | Hedberg | 326/30 |
|---|---|---|---|---|
| 6,567,318 | B2 * | 5/2003 | Bedarida et al. | 365/189.05 |
| 6,642,741 | B2 * | 11/2003 | Metz et al. | 326/30 |
| 6,922,076 | B2 * | 7/2005 | Braceras et al. | 326/30 |
| 7,020,818 | B2 * | 3/2006 | Dour et al. | 714/724 |
| 7,102,381 | B2 * | 9/2006 | Chen et al. | 326/30 |
| 7,239,171 | B1 * | 7/2007 | Wang et al. | 326/30 |
| 7,403,034 | B2 * | 7/2008 | Dour et al. | 326/32 |
| 7,417,452 | B1 * | 8/2008 | Wang et al. | 326/30 |
| 7,423,450 | B2 * | 9/2008 | Santurkar et al. | 326/30 |
| 7,443,193 | B1 * | 10/2008 | Santurkar et al. | 326/30 |
| 7,719,307 | B2 * | 5/2010 | Lee | 326/30 |
| 2005/0046441 | A1 * | 3/2005 | Braceras et al. | 326/30 |
| 2005/0194991 | A1 * | 9/2005 | Dour et al. | 326/30 |
| 2009/0167344 | A1 * | 7/2009 | Lee | 326/30 |
| 2010/0007373 | A1 * | 1/2010 | Wong | 326/30 |

* cited by examiner

*Primary Examiner*—James H. Cho
*Assistant Examiner*—Matthew C Tabler
(74) *Attorney, Agent, or Firm*—IP & T Group LLP (57) ABSTRACT

An impedance matching device includes a calibration circuit configured to generate impedance calibration codes for modification of impedance; a code modification unit configured to modify the impedance calibration codes according to impedance setting information and output modified impedance calibration codes; and a termination impedance unit configured to terminate an interface node with impedance determined according to the modified impedance calibration codes.

11 Claims, 7 Drawing Sheets

TERMINATION CIRCUIT AND IMPEDANCE MATCHING DEVICE INCLUDING THE SAME

CROSS-REFERENCE TO RELATED APPLICATION

The present application claims priority of Korean Patent Application No. 10-2009-0050486, filed on Jun. 8, 2009, which disclosure is incorporated herein by reference in its entirety.

BACKGROUND OF THE INVENTION

The present invention relates to a termination circuit and an impedance matching device including the same, and more particularly, to technology for reducing an entire area of an impedance matching device.

Semiconductor devices may be implemented as integrated circuit (IC) chips such as central processing units (CPUs), memories, and gate arrays, and are incorporated into a variety of electrical products such as personal computers, servers and workstations. Semiconductor devices often include a receiving circuit configured to receive external signals via input pads, and an output circuit configured to provide internal signals to the outside via output pads.

As the operating speed of electrical products increases, a voltage-swing of a signal interfaced between semiconductor devices gradually reduces to minimize a delay time taken for signal transmission. However, in reducing the voltage-swing of the signal, effect of external noise significantly increases, causing severe signal reflectance at an interface terminal due to impedance mismatching. Such impedance mismatching is generally caused by external noise, variation of a power supply voltage, change in an operating temperature, change in a manufacturing process, and so on. The impedance mismatching may lead to a difficulty in high-speed transmission of data and distortion of output data. Therefore, if semiconductor devices receive the distorted output signal through an input/interface terminal, it frequently gives rise to problems such as a setup/hold failure, and an error in decision of an input level.

In particular, in order to resolve the above problems, a memory device requiring high-speed performance employs an impedance matching circuit, which is called an on die termination (ODT) device, near around an input pad inside an IC chip. In a typical ODT scheme, source termination is performed at a transmitting end by an output circuit, and parallel termination is performed by a termination circuit connected in parallel with respect to a receiving circuit coupled to the input pad.

ZQ calibration refers to a procedure of generating calibration codes which are varied with process, voltage and temperature (PVT) conditions. The resistance of the ODT device, e.g., a termination resistance at a DQ pad in a memory device, is calibrated using the calibration codes resulting from the ZQ calibration. The ZQ calibration is named because the calibration is performed using a ZQ node that is a node for calibration.

The following description will be made on a calibration circuit for generating impedance calibration codes, and a termination circuit for terminating input/output nodes by using the generated impedance calibration codes.

Figure 1:
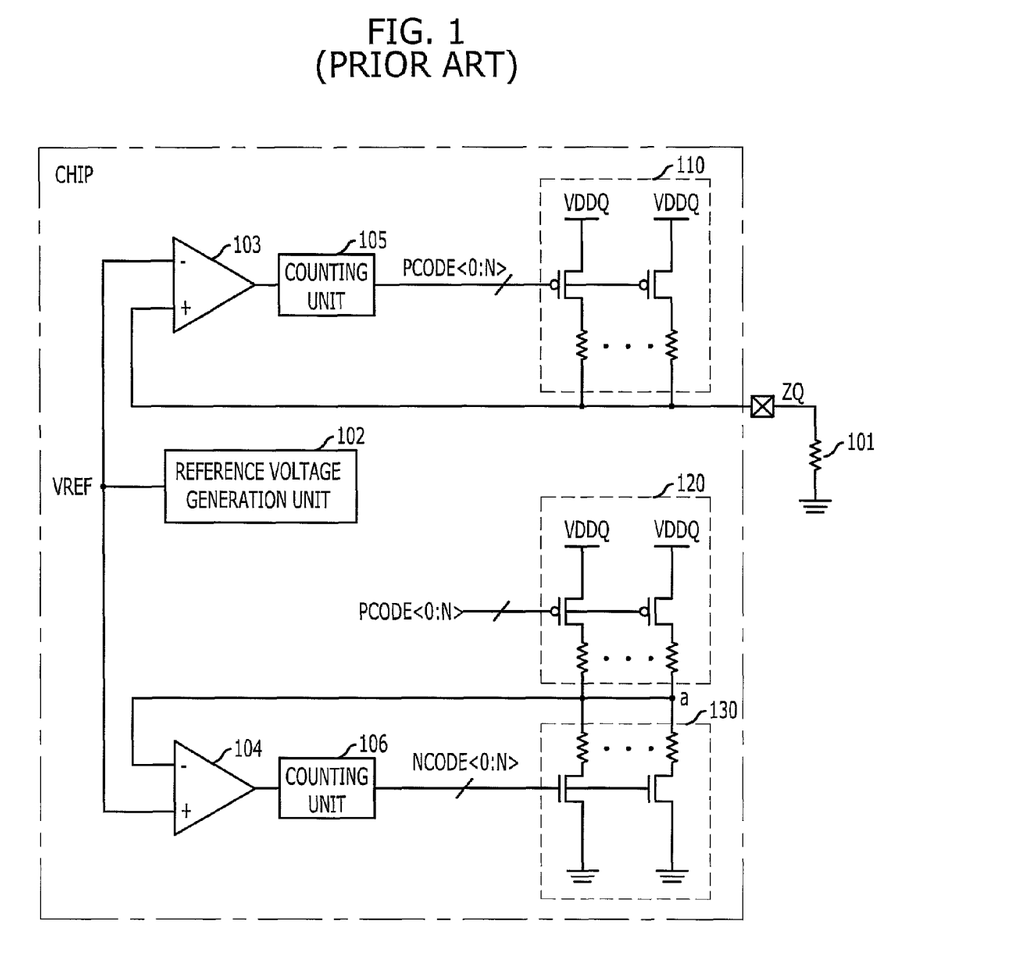
FIG. 1 is a circuit diagram of a conventional calibration circuit.

FIG. 1 is a circuit diagram of a conventional calibration circuit.

Referring to FIG. 1, the conventional calibration circuit includes a pull-up reference impedance unit 110, a dummy reference impedance unit 120, a pull-down reference impedance unit 130, a reference voltage generation unit 102, comparison units 103 and 104, and counting units 105 and 106.

Upon operation of the conventional calibration circuit, the comparison unit 103 compares a reference voltage VREF (generally, $$\frac{VDDQ}{2}),$$

which is generated from the reference voltage generation unit 102, with a voltage of a calibration node ZQ, which is generated by a voltage division of an external resistor 101 connected to a calibration pad (hereinafter, referred to as 120Ω) and the pull-up reference impedance unit 110, and generates an up/down signal UP/DOWN.

The counting unit 105 receives the up/down signal UP/DOWN to generate pull-up impedance calibration codes PCODE<0:N>. The pull-up impedance calibration codes PCODE<0:N> adjusts the total impedance of the pull-up reference impedance unit 110 by turning on/off parallel resistors of the pull-up reference impedance unit 110 (the impedances of the parallel resistors are designed according to binary weights). The adjusted impedances of the pull-up reference impedance unit 110 again influence the voltage of the ZQ node and the above-described operations are repeated. As a result, the pull-up impedance calibration codes PCODE<0:N> are counted until the total impedance of the pull-up reference impedance unit 110 is equal to the impedance of the external resistor 101. The above-described operation is called a pull-up calibration operation.

The pull-up impedance calibration codes PCODE<0:N> generated by the pull-up calibration operation are inputted to the dummy reference impedance unit 120 to determine the total impedance of the dummy reference impedance unit 120. In the similar manner to the pull-up calibration operation, the pull-down calibration operation starts to calibrate a voltage of a node A to be equal to the reference voltage VREF by using the comparison unit 104 and the counting unit 106. That is, the total impedance of the pull-down reference impedance unit 130 is calibrated to be equal to the total impedance of the dummy reference impedance unit 120.

Figure 2:
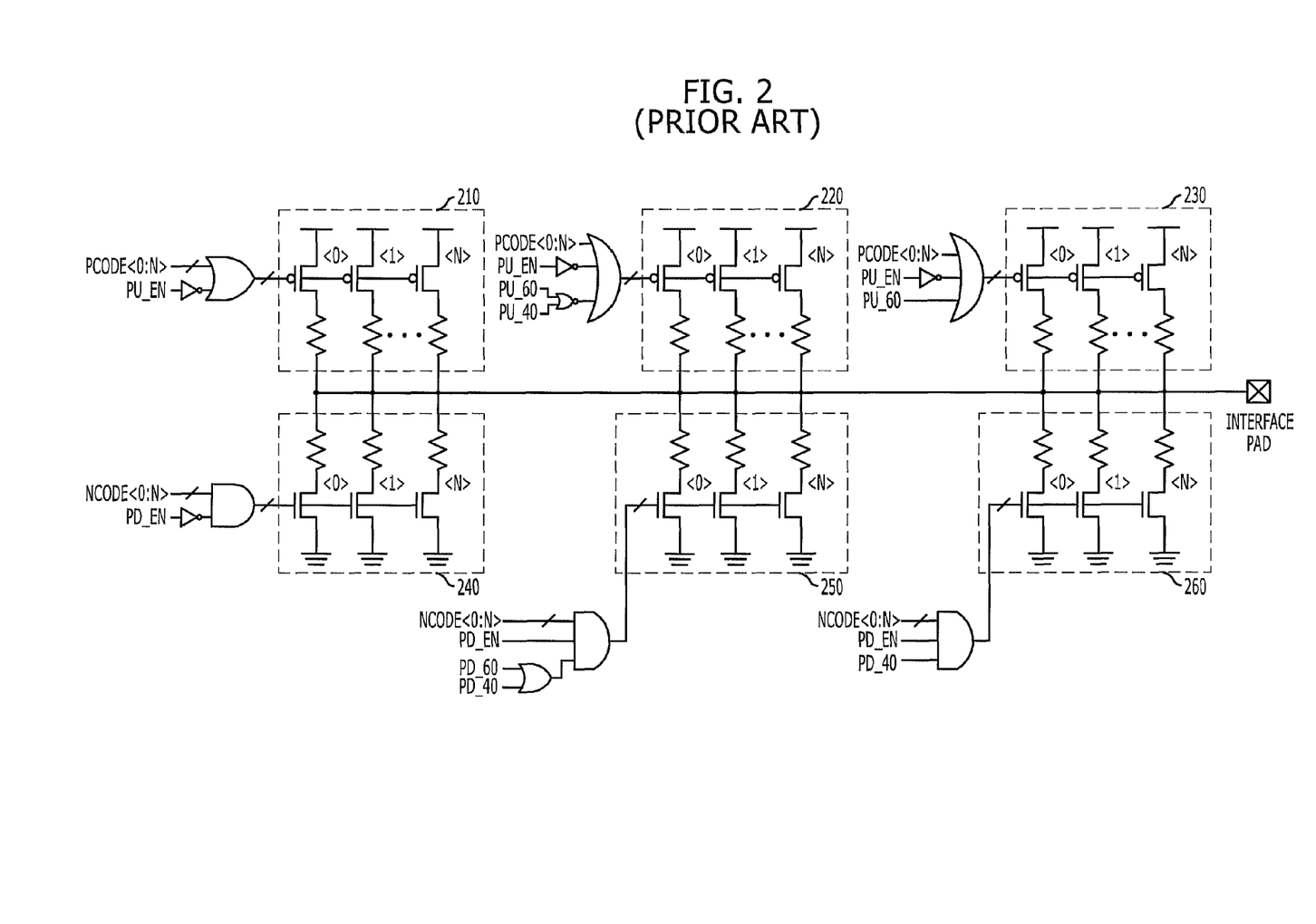
FIG. 2 is a circuit diagram of a conventional termination circuit.

The impedance calibration codes PCODE<0:N> and NCODE<0:N> generated by the ZQ calibration operation are inputted to a termination circuit of FIG. 2 to adjust the termination impedance.

FIG. 2 is a circuit diagram of a conventional termination circuit.

The termination circuit refers to a circuit that receives the impedance calibration codes PCODE<0:N> and NCODE<0:N> from the calibration circuit of FIG. 1 to terminate interface pads.

The termination circuit includes pull-up termination impedance units 210, 220 and 230, and pull-down termination impedance units 240, 250 and 260. The termination circuit may include either of the pull-up termination impedance units 210, 220 and 230 and the pull-down termination impedance units 240, 250 and 260 according to a termination scheme.

The pull-up termination impedance units 210, 220 and 230 are designed to have the same configuration as the pull-up reference impedance unit 110 and to receive the pull-up impedance calibration codes PCODE<0:N> in the same manner. Therefore, the pull-up termination impedance units 210, 220 and 230 have the impedance of 120Ω just like the pull-up reference impedance unit 110. The pull-down termination impedance units 240, 250 and 260 are designed to have the same configuration as the pull-down reference impedance unit 130 and to receive the pull-down impedance calibration codes NCODE<0:N> in the same manner. Therefore, the pull-down termination impedance units 240, 250 and 260 have the impedance of 120Ω just like the pull-down reference impedance unit 130.

A pull-up termination enable signal PU_EN is a signal for enabling the pull-up termination operation, and a pull-down termination enable signal PD_EN is a signal for enabling the pull-down termination operation. When the pull-up termination enable signal PU_EN is disabled, the parallel resistors of the pull-up termination impedance units 210, 220 and 230 are turned-off. When the pull-down termination enable signal PD_EN is disabled, the parallel resistors of the pull-down termination impedance units 240, 250 and 260 are turned-off. "Off" conditions of the resistors means that the resistors are disconnected, that is, the termination operation is not performed.

Signals PU_60 and PU_40 are signals for setting the pull-up termination impedance. This is because the pull-up termination impedance is not always fixed, but is changed according to system environment. For example, semiconductor memory devices are designed to support termination impedances of 120Ω, 60Ω and 40Ω according to a mode register setting (MRS). The signal PU_60 is a signal for setting the pull-up termination impedance to 60Ω. When the signal PU_60 is enabled, the two pull-up termination impedance units 210 and 220 are enabled. Since the pull-up termination impedance units 210 and 220 each having the impedance of 120Ω are connected in parallel, the pull-up termination impedance becomes 60Ω. The signal PU_40 is a signal for setting the pull-up termination impedance to 40Ω. When the signal PU_40 is enabled, the three pull-up termination impedance units 210, 220 and 230 are enabled. Since the pull-up termination impedance units 210, 220 and 230 each having the impedance of 120Ω are connected in parallel, the pull-up termination impedance becomes 40Ω. When both the signals PU_60 and PU_40 are disabled, only the pull-up termination impedance unit 210 is enabled and thus the pull-up termination impedance becomes 120Ω.

Signals PD_60 and PD_40 are signals for setting the pull-down termination impedance. The signal PD_60 is a signal for setting the pull-down termination impedance to 60Ω. When the signal PD_60 is enabled, the two pull-down termination impedance units 240 and 250 are enabled. Since the pull-down termination impedance units 240 and 250 each having the impedance of 120Ω, are connected in parallel, the pull-down termination impedance becomes 60Ω. The signal PD_40 is a signal for setting the pull-down termination impedance to 40Ω. When the signal PD_40 is enabled, the three pull-down termination impedance units 240, 250 and 260 are enabled. Since the pull-down termination impedance units 240, 250 and 260 each having the impedance of 120Ω are connected in parallel, the pull-down termination impedance becomes 40Ω. When both the signals PD_60 and PD_40 are disabled, only the pull-down termination impedance unit 240 is enabled and thus the pull-down termination impedance becomes 120Ω.

The above-described termination circuit may be a main driver of an output driver. In case where the impedance of the output driver is set to 60Ω, if the signals PU_60 and PD_60 are enabled and the pull-up termination enable signal PU_EN is enabled, "high" data is outputted through an interface pad (in this case, a data output pad). If the pull-down termination enable signal PD_EN is enabled, "low" data is outputted through the interface pad.

As described above, the conventional termination circuit includes a plurality of termination impedance units to support various termination impedances, for example, 120Ω, 60Ω and 40Ω. In this case, the plurality of termination impedance units substantially increases the circuit area. Moreover, since the plurality of termination impedance units 210, 220, 230, 240, 250 and 260 are connected to the interface pad, a large capacitance component is generated in the interface pad, causing performance degradation of a chip.

SUMMARY OF THE INVENTION

An embodiment of the present invention is directed to providing a termination circuit, which provides various termination impedances without increasing a circuit area, and an impedance matching device including the same.

In accordance with an aspect of the present invention, there is provided an impedance matching device, including a calibration circuit configured to generate impedance calibration codes for modification of impedance; a code modification unit configured to modify the impedance calibration codes according to impedance setting information and output modified impedance calibration codes; and a termination impedance unit configured to terminate an interface node with impedance determined according to the modified impedance calibration codes.

In accordance with another aspect of the present invention, there is provided an impedance matching device, including: a calibration circuit configured to generate pull-up impedance calibration codes for modifying pull-up impedance, and pull-down impedance calibration codes for modifying pull-down impedance; a code modification unit configured to multiply the pull-up impedance calibration codes according to impedance setting information to output modified pull-up impedance calibration codes, and to multiply the pull-down impedance calibration codes according to the impedance setting information to output modified pull-down impedance calibration codes; a pull-up termination impedance unit configured to terminate an interface node with impedance determined according to the modified pull-up impedance calibration codes; and a pull-down termination impedance unit configured to terminate the interface node with impedance determined according to the modified pull-down impedance calibration codes.

In accordance with another aspect of the present invention, there is provided a termination circuit, including a code modification unit configured to modify impedance calibration codes according to impedance setting information and output modified impedance calibration codes; and a termination impedance unit configured to terminate an interface node with impedance determined according to the modified impedance calibration codes.

In accordance with another aspect of the present invention, there is provided an output driver, including a code modification unit configured to modify pull-up impedance calibration codes and pull-down impedance calibration codes according to impedance setting information and output modified pull-up impedance calibration codes and modified pull-down impedance calibration codes; a pull-up driver enabled when high data is outputted, and configured to terminate an interface node with impedance determined according to the modified pull-up impedance calibration codes; and a pull-down driver enabled when low data is outputted, and configured to terminate the interface node with impedance determined according to the modified pull-down impedance calibration codes.

DESCRIPTION OF SPECIFIC EMBODIMENTS

Other objects and advantages of the present invention can be understood by the following description, and become apparent with reference to the embodiments of the present invention.

Figure 3:
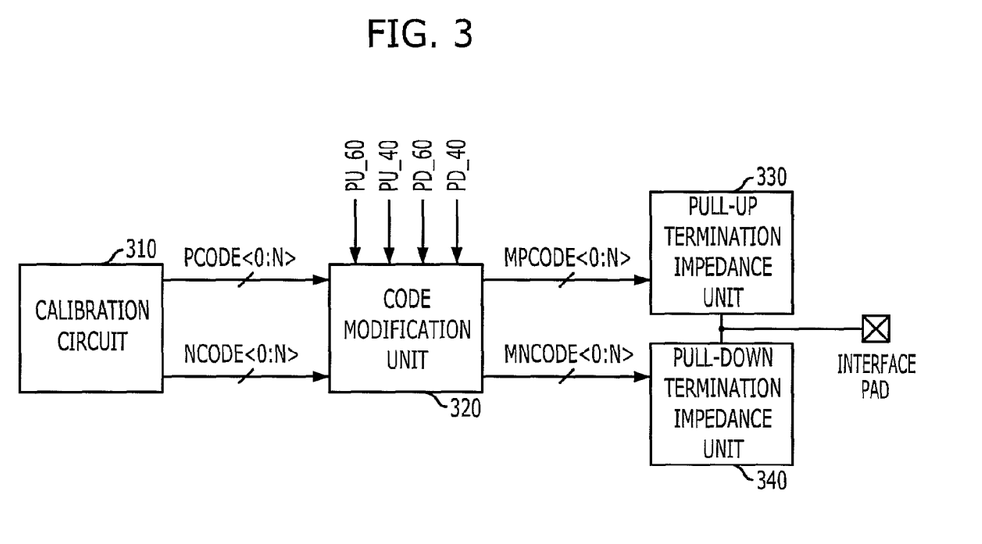
FIG. 3 is a block diagram of an impedance matching device in accordance with an embodiment of the present invention.

FIG. 3 is a block diagram of an impedance matching device in accordance with an embodiment of the present invention.

Referring to FIG. 3, the impedance matching device includes a calibration circuit 310, a code modification unit 320, and termination impedance units 330 and 340. The calibration circuit 310 generates impedance calibration codes PCODE<0:N> and NCODE<0:N> for modifying an impedance. The code modification unit 320 modifies the impedance calibration codes PCODE<0:N> and NCODE<0:N> according to impedance setting information PU_60, PU_40, PD_60 and PD_40 and outputs the modified impedance calibration codes MPCODE<0:N> and NCODE<0:N>. The impedance units 330 and 340 terminate an interface node (a node of a chip connected to an interface pad) with an impedance determined according to the modified impedance calibration codes MPCODE<0:N> and MNCODE<0:N>.

The calibration circuit 310 generates the impedance calibration codes for modifying the termination impedance. In FIG. 3, since it is assumed that the impedance matching device includes the pull-up termination impedance unit 330 and the pull-down termination impedance unit 340, the calibration circuit 310 generates the pull-up impedance calibration codes PCODE<0:N> and the pull-down impedance calibration codes NCODE<0:N>. However, in case where the impedance matching device includes only the pull-up termination impedance unit 330, that is, a system including the impedance matching device performs only the pull-up termination operation, the calibration circuit 310 may be designed to generate only the pull-up impedance calibration codes PCODE<0:N>. Also, in case where the impedance matching device includes only the pull-down termination impedance unit 340, that is, a system including the impedance matching device performs only the pull-down termination operation, the calibration circuit 310 may be designed to generate only the full-down impedance calibration codes NCODE<0:N>. Since the calibration circuit 310 has been described in the BACKGROUND OF THE INVENTION" section (see FIG. 1) and the calibration circuit 310 is well known to a person skilled in the art, further detailed description thereof will be omitted.

The code modification unit 320 modifies the impedance calibration codes PCODE<0:N> and NCODE<0:N> according to the impedance setting information PU_60, PU_40, PD_60 and PD_40 and generates the modified impedance calibration codes MPCODE<0:N> and MNCODE<0:N>. Specifically, the code modification unit 320 multiplies the impedance calibration codes PCODE<0:N> and NCODE<0:N> according to the impedance setting information PU_60, PU_40, PD_60 and PD_40 and outputs the multiplication result as the modified impedance calibration codes MPCODE<0:N> and MNCODE<0:N>. Although the code modification unit 320 multiplying the pull-up impedance calibration codes PCODE<0:N> to generate the modified pull-up impedance calibration codes MPCODE<0:N>, and multiplying the pull-down image calibration codes NCODE<0:N> to generate the modified pull-down impedance calibration codes MNCODE<0:N> is illustrated in FIG. 3, the modification unit 320 may also be designed to multiply only the pull-up impedance calibration codes PCODE<0:N> or only the pull-down impedance calibration codes NCODE<0:N> according to termination specification of a system including the impedance matching device. In case where the termination impedance is set to 60Ω, the code modification unit 320 multiplies the impedance calibration codes PCODE<0:N> and NCODE<0:N> by 2 (×2). In case where the termination impedance is set to 40Ω, the code modification unit 320 multiplies the impedance calibration codes PCODE<0:N> and NCODE<0:N> by 3 (×3). On the other hand, in case where the termination impedance is set to 120Ω, the code modification unit 320 outputs the impedance calibration codes PCODE<0:N> and NCODE<0:N> as they are as the modified impedance calibration codes MPCODE<0:N> and MNCODE<0:N>. The impedance setting information PU_60, PU_40, PD_60 and PD_40 is information used for setting the termination impedance of the system and is determined according to the setting of the system. In the case of a semiconductor memory device, the setting of the termination impedance is achieved by a mode register setting (MRS). In this case, the impedance setting information PU_60, PU_40, PD_60 and PD_40 is an output signal of an MRS circuit.

The termination impedance units 330 and 340 terminate the interface node with the impedance determined according to the modified impedance calibration codes MPCODE<0:N> and MNCODE<0:N>. The impedances of the termination impedance units 330 and 340 are modified according to a multiplication factor by which the impedance calibration codes PCODE<0:N> and NCODE<0:N> are multiplied. If the termination impedance unit receives the 1× modified impedance calibration codes MPCODE<0:N>=PCODE<0:N> and MNCODE<0:N>=NCODE<0:N>, the termination impedance units 330 and 340 have the impedance of 120Ω.

If the termination impedance unit receives the 2× modified impedance calibration codes MPCODE<0:N>=2*PCODE<0:N> and MNCODE<0:N>=2*NCODE<0:N>, the termination impedance units 330 and 340 have the impedance of 60Ω. If the termination impedance unit receives the 3× modified impedance calibration codes MPCODE<0:N>=3*PCODE<0:N> and MNCODE<0:N>=3*NCODE<0:N>, the termination impedance units 330 and 340 have the impedance of 40Ω. That is, if the impedance calibration codes PCODE<0:N> and NCODE<0:N> are multiplied by N, the termination impedance units 330 and 340 have the impedance of 1/N times of the original impedance (the impedance when receiving the unmodified impedance calibration codes; in this case, 120Ω). In the prior art (see FIG. 2), the plurality of termination impedance units 210, 220, 230, 240, 250 and 260 are connected in parallel to set the termination impedance to 60Ω and 40Ω. However, in the embodiment of the present invention, various termination impedances can be supported by inputting the modified impedance calibration codes MPCODE<0:N> and MNCODE<0:N> to only one termination impedance unit 330 and 340. Although the impedance matching device including both the pull-up termination impedance unit 330 and the pull-down termination impedance unit 340 is illustrated in FIG. 3, only one of the pull-up termination impedance unit 330 and the pull-down termination impedance unit 340 may be used according to the system including the impedance matching device.

Figure 4:
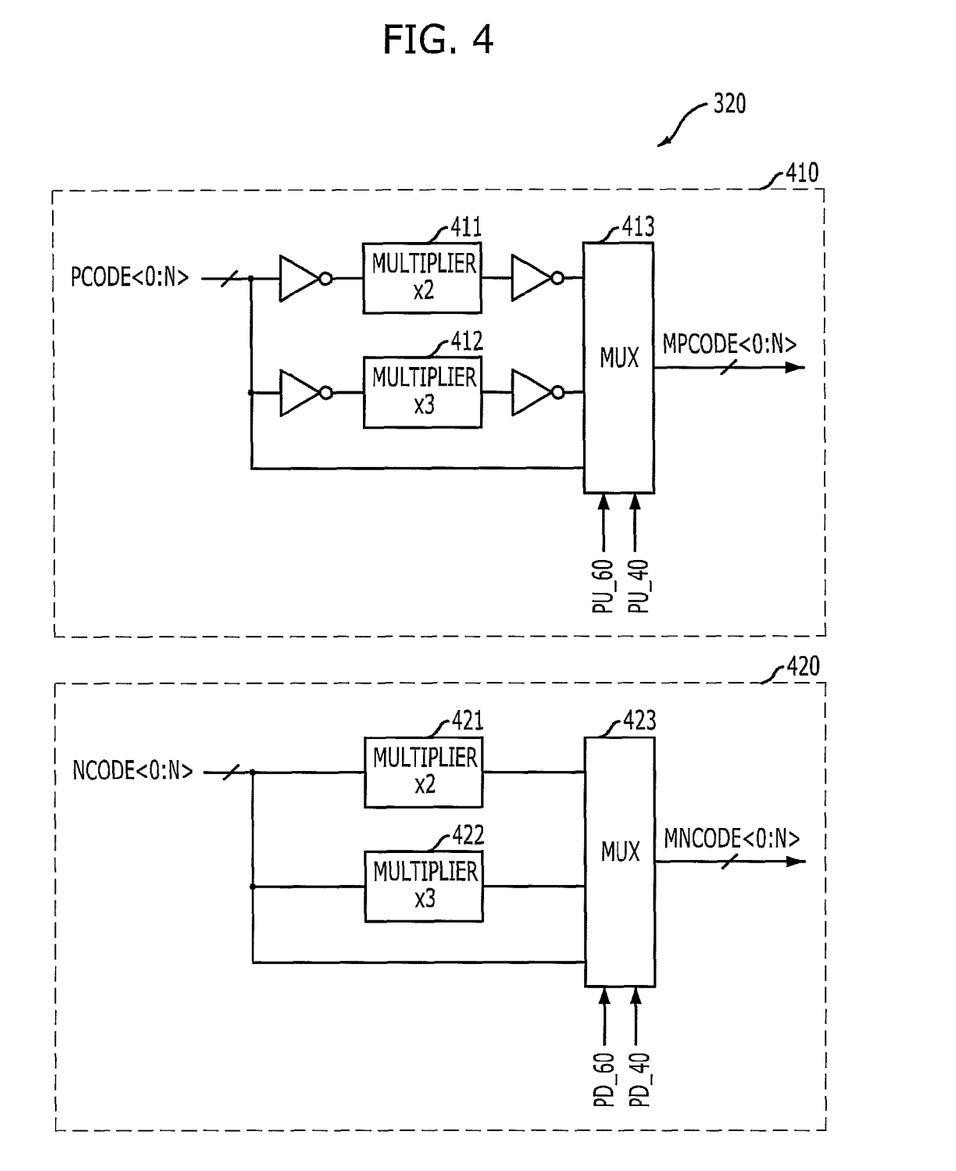
FIG. 4 is a block diagram of a code modification unit of FIG. 3.

FIG. 4 is a block diagram of the code modification unit 320 of FIG. 3.

Referring to FIG. 4, the code modification unit 320 includes a pull-up code modification unit 410 and a pull-down code modification unit 420. The pull-up code modification unit 410 multiplies the pull-up impedance calibration codes PCODE<0:N> to generate the modified pull-up impedance calibration codes MPCODE<0:N>, and pull-down code modification unit 420 multiplies the pull-down impedance calibration codes NCODE<0:N> to generate the modified pull-down impedance calibration codes MNCODE<0:N>. As described above, in case where the impedance matching device uses only the pull-up impedance calibration codes PCODE<0:N> or only the pull-down impedance calibration codes NCODE<0:N>, only one of the pull-up code modification unit 410 and the pull-down code modification unit 420 may be used.

The pull-up code modification unit 410 includes at least one or more multipliers 411 and 412 and a multiplexer 413. The multipliers 411 and 412 multiply the pull-up impedance calibration codes PCODE<0:N> by different multiplication factors, respectively. The pull-up impedance calibration codes PCODE<0:N> are inverted by inverters 141 and 142 and inputted to the multipliers 411 and 412. This is because the pull-up impedance calibration codes PCODE<0:N> are codes for controlling PMOS transistors, and "1" and "0" indicate a "disabled state" and an "enabled state", respectively. In the pull-up impedance calibration codes PCODE<0: N>, "00 . . . 0" is a code indicating the greatest value, and "11 . . . 1" is a code indicating the least value. After the multiplication through the multipliers 411 and 412, the pull-up impedance calibration codes PCODE<0:N> are inverted so that desired code values can be maintained. The number of the multipliers 411 and 412 is changed according to the number of impedances the termination circuit supports. The multiplexer 413 selects one of the output codes of the multipliers 411 and 412 and the pull-up impedance calibration codes PCODE<0:N> in response to the pull-up impedance setting information PU_60 and PU_40, and outputs the selected codes as the modified pull-up impedance calibration codes MPCODE<0:N>. When the pull-up impedance is set to 120Ω, that is, PU_60 and PU_40 are all disabled, the multiplexer 413 outputs the pull-up impedance calibration codes PCODE<0:N>. When the pull-up impedance is set to 60Ω, that is, PU_60 is enabled, the multiplexer 413 outputs the output of the multiplier 411. When the pull-up impedance is set to 40Ω, that is, PU_40 is enabled, the multiplexer 413 outputs the output of the multiplier 412.

The pull-down code modification unit 420 includes at least one or more multipliers 421 and 422 and a multiplexer 423. The multipliers 421 and 422 multiply the pull-down impedance calibration codes NCODE<0:N> by different multiplication factors, respectively. In the pull-down impedance calibration codes NCODE<0:N>, "11 . . . 1" is a code indicating the greatest value, and "00 . . . 0" is a code indicating the least value, as opposed to the pull-up impedance calibration codes PCODE<0:N>. Therefore, inverters are not used. The multiplexer 423 selects one of the output codes of the multipliers 421 and 422 and the pull-down impedance calibration codes NCODE<0:N> in response to the pull-down impedance setting information PD_60 and PD_40, and outputs the selected codes as the modified pull-down impedance calibration codes MNCODE<0:N>. When the pull-down impedance is set to 120Ω, that is, PD_60 and PD_40 are all disabled, the multiplexer 423 outputs the pull-down impedance calibration codes NCODE<0:N>. When the pull-down impedance is set to 60Ω, that is, PD_60 is enabled, the multiplexer 423 outputs the output of the multiplier 421. When the pull-down impedance is set to 40Ω, that is, PD_40 is enabled, the multiplexer 423 outputs the output of the multiplier 422.

Although the pull-up impedance setting information PU_60 and PU_40 and the pull-down impedance setting information PD_60 and PD_40 are separately provided in FIG. 4, they may also be commonly used without discrimination because, in many cases, the pull-up impedance setting information PU_60 and PU_40 and the pull-down impedance setting information PD_60 and PD_40 are set to the same values (for example, P_60 and P_40 set the pull-up and pull-down impedances).

Figure 5:
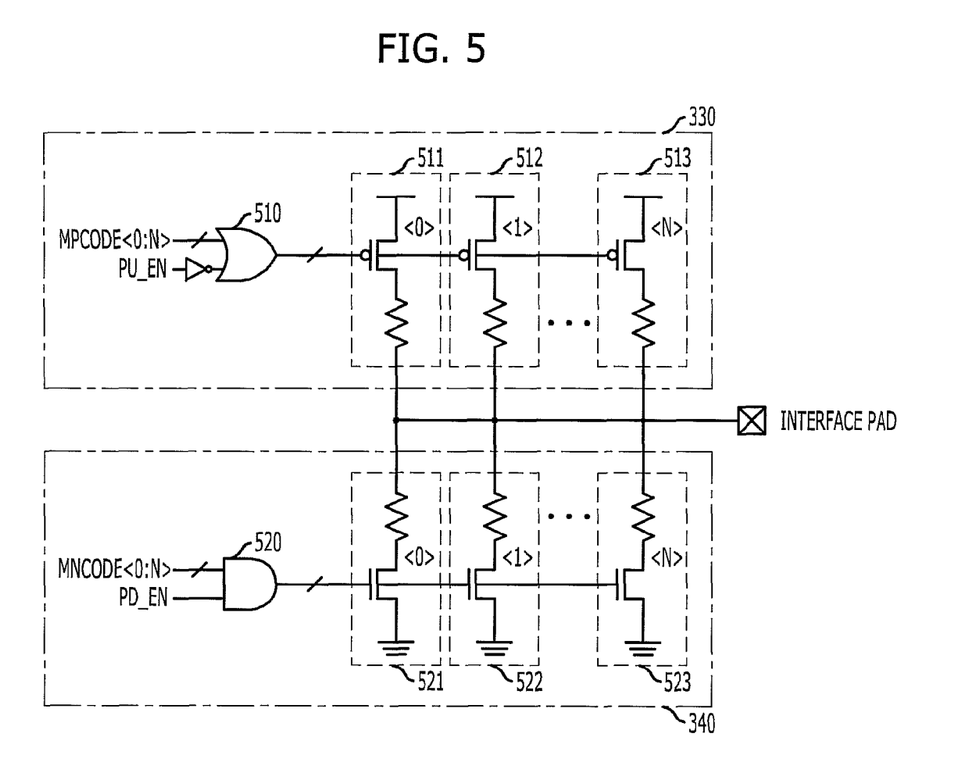
FIG. 5 is a circuit diagram of termination impedance units of FIG. 3.

FIG. 5 is a circuit diagram of the termination impedance units 330 and 340 of FIG. 3.

Referring to FIG. 5, the pull-up termination impedance unit 330 includes a plurality of pull-up resistor units 511 to 513 that are turned-on or off according to the modified impedance calibration codes MPCODE<0:N> when the pull-up termination operation is enabled. The plurality of pull-up resistor units 511 to 513 are connected in parallel to the interface node and terminate the interface node.

When the pull-up termination enable signal PU_EN is enabled to a low level, since codes outputted from an OR gate 510 are all "1", the pull-up resistor units 511 to 513 are turned-off. Hence, the pull-up termination operation is not performed. When the pull-up termination enable signal PU_EN is enabled to a high level, the modified pull-up impedance calibration codes MPCODE<0:N> are inputted to the pull-up resistor units 511 to 513. Therefore, the pull-up resistor units 511 to 513 are turned-on/off according to the code values of the modified pull-up impedance calibration codes MPCODE<0:N>, and the interface node is terminated.

The pull-down termination impedance unit 340 includes a plurality of pull-down resistor units 521 to 523 that are turned-on or off according to the modified impedance calibration codes MNCODE<0:N> when the pull-down termination operation is enabled. The plurality of pull-down resistor units 521 to 523 are connected in parallel to the interface node and terminate the interface node.

When the pull-down termination enable signal PD_EN is enabled to a low level, since codes outputted from an AND gate 520 are all "0", the pull-down resistor units 521 to 523 are turned-off. Hence, the pull-down termination operation is not performed. When the pull-down termination enable signal PD_EN is enabled to a high level, the modified pull-down impedance calibration codes MNCODE<0:N> are inputted to the pull-down resistor units 521 to 523. Therefore, the pull-down resistor units 521 to 523 are turned-on/off according to the code values of the modified pull-down impedance calibration codes MNCODE<0:N>, and the interface node is terminated.

As described above, the termination impedance units 330 and 340 may be an output driver that outputs data. In case where the impedance of the output driver is set to 60Ω, if the signals PU_60 and PD_60 are enabled and the pull-up termination enable signal PU_EN is enabled, "high" data is outputted through an interface pad (in this case, a data output pad). If the pull-down termination enable signal PD_EN is enabled, "low" data is outputted through the interface pad. When the termination impedance units 330 and 340 constitute an output driver, the enabling/disabling of the pull-up termination enable signal PU_EN and the pull-down termination enable signal PD_EN is determined according to the logic values of data to be outputted. Specifically, when outputting the high data, the pull-up termination enable signal PU_EN is enabled. When outputting the low data, the pull-down termination enable signal PD_EN is enabled.

Therefore, the termination impedance units 330 and 340 can be called a pull-up driver and a pull-down driver, respectively.

Figure 6:
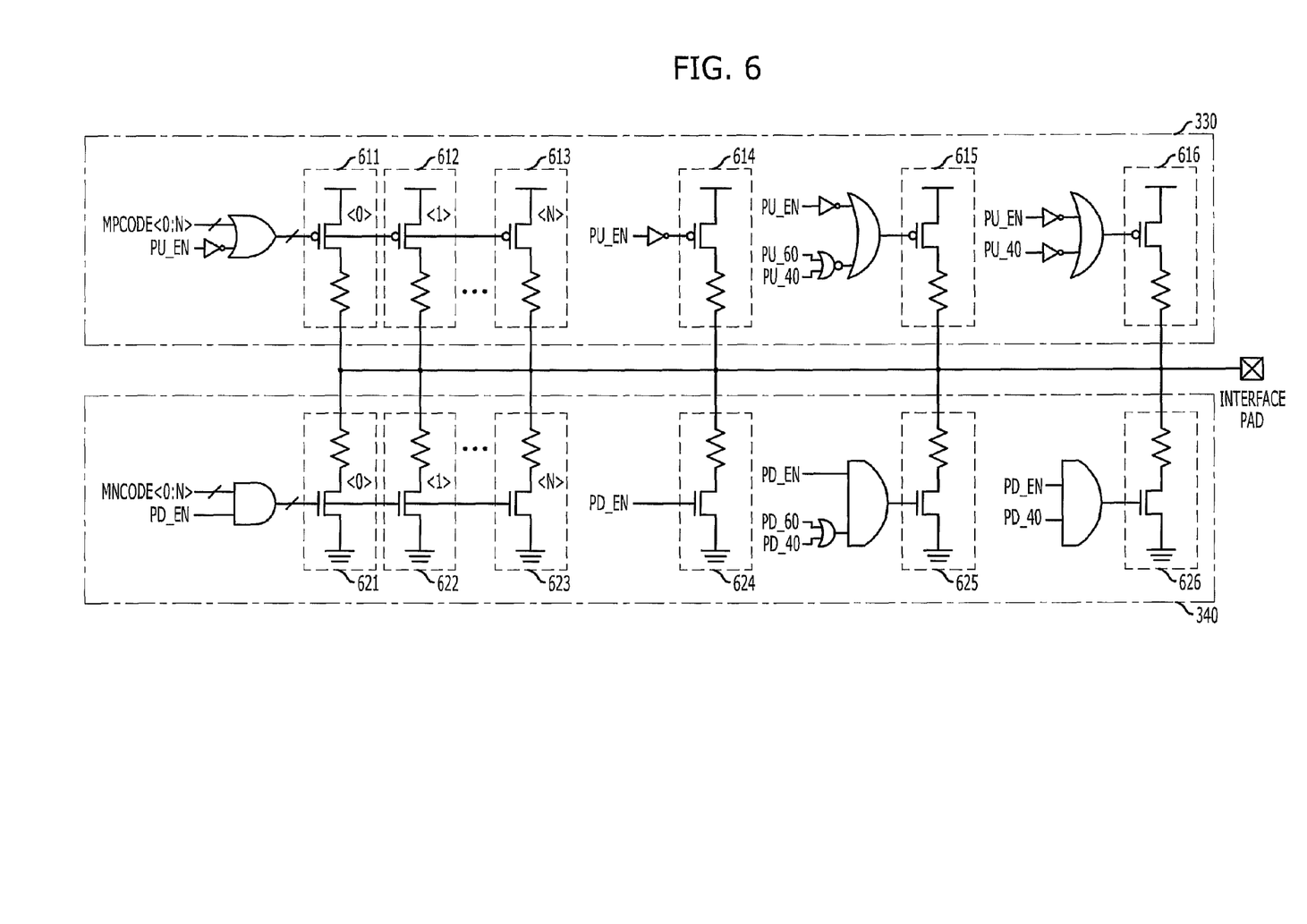
FIG. 6 is a circuit diagram of termination impedance units of FIG. 3 in accordance with another embodiment of the present invention.

FIG. 6 is a circuit diagram of the termination impedance units 330 and 340 of FIG. 3 in accordance with another embodiment of the present invention.

Specifically, FIG. 6 illustrates a case where the termination impedance units 330 and 340 include resistors that are turned-on during the termination operation regardless codes.

The pull-up termination impedance unit 330 includes a plurality of first pull-up resistor units 611 to 613, a second pull-up resistor unit 614, and one or more third pull-up resistor units 615 and 616. The first pull-up resistor units 611 to 613 are turned-on/off according to the modified pull-up impedance calibration codes MPCODE<0:N> when the pull-up termination operation is enabled. The second pull-up resistor unit 614 maintains an on-state when the pull-up termination operation is enabled. The third pull-up resistor units 615 and 616 are turned-on/off according to the pull-up impedance setting information PU_60 and PU_40 when the pull-up termination operation is enabled. That is, compared with the pull-up termination impedance unit of FIG. 5, the pull-up termination impedance unit 330 of FIG. 6 further includes the second pull-up resistor unit 614 and the third pull-up resistor units 615 and 616. Resistors included in the second pull-up resistor unit 614 and the third pull-up resistor units 615 and 616 are designed to have the same impedance, which is higher than the largest impedance of the resistors included in the first pull-up resistor units 611 to 613.

The second pull-up resistor unit 614 are turned on when the pull-up termination enable signal PU_EN is enabled. That is, when the pull-up termination impedance unit 330 operates, the second pull-up resistor unit 614 are turned on. When the pull-up termination enable signal PU_EN is enabled, the third pull-up resistor units 615 and 616 are turned-on/off according to the impedance. When the impedance is set to 120Ω in the pull-up termination operation, that is, PU_60 and PU_40 are all disabled, the second pull-up resistor unit 614 are turned on, without regard to the codes MPCODE<0:N>. When the impedance is set to 60Ω, that is, PU_60 is enabled, the second pull-up resistor unit 614 and the third pull-up resistor unit 615 are turned-on regardless of the codes MPCODE<0:N>. When the impedance is set to 40Ω, that is, PU_40 is enabled, the second pull-up resistor unit 614 and the third pull-up resistor units 615 and 616 are turned-on regardless of the codes MPCODE<0:N>. In this way, the resistors being in the on-state without regard to the codes MPCODE<0:N> are provided, and the impedance is adjusted according to the impedance set by the impedance setting information PU_60 and PU_40.

If the resistors being in the on-state regardless the codes MPCODE<0:N> just like the second pull-up resistor unit 614 and the third pull-up resistor units 615 and 616 are provided in the pull-up termination impedance unit 330, the resolution of the pull-up termination impedance unit 330 is increased. This is because the resistors being in the on-state regardless of the codes MPCODE<0:N> can prevent the rapid change of the total impedance of the pull-up termination impedance unit even though the codes MPCODE<0:N> change.

The pull-down termination impedance unit 340 includes a plurality of first pull-down resistor units 621 to 623, a second pull-down resistor unit 624, and one or more third pull-down resistor units 625 and 626. The first pull-down resistor units 621 to 623 are turned-on/off according to the modified pull-down impedance calibration codes MNCODE<0:N> when the pull-down termination operation is enabled. The second pull-down resistor unit 624 maintains an on-state when the pull-down termination operation is enabled. The third pull-down resistor units 625 and 626 are turned-on/off according to the pull-down impedance setting information PD_60 and PD_40 when the pull-down termination operation is enabled. That is, compared with the pull-down termination impedance unit of FIG. 5, the pull-down termination impedance unit 340 of FIG. 6 further includes the second pull-down resistor unit 624 and the third pull-down resistor units 625 and 626. Resistors included in the second pull-down resistor unit 624 and the third pull-down resistor units 625 and 626 are designed to have the same impedance, which is higher than the largest impedance of the resistors included in the first pull-down resistor units 621 to 623.

The second pull-down resistor unit 624 are turned on when the pull-down termination enable signal PD_EN is enabled. That is, when the pull-down termination impedance unit 340 operates, the second pull-down resistor unit 624 are turned on. When the pull-down termination enable signal PD_EN is enabled, the third pull-down resistor units 625 and 626 are turned-on/off according to the impedance. When the impedance is set to 120Ω in the pull-down termination operation, that is, PD_60 and PD_40 are all disabled, the second pull-down resistor unit 624 are turned on, without regard to the codes MNCODE<0:N>. When the impedance is set to 60Ω, that is, PD_60 is enabled, the second pull-down resistor unit 624 and the third pull-down resistor unit 625 are turned-on regardless of the codes MNCODE<0:N>. When the impedance is set to 40Ω, that is, PD_40 is enabled, the second pull-down resistor unit 624 and the third pull-down resistor units 625 and 626 are turned-on regardless of the codes MNCODE<0:N>. In this way, the resistors being in the on-state regardless the codes MNCODE<0:N> are provided, and the impedance is adjusted according to the impedance set by the impedance setting information PD_60 and PD_40.

If the resistors being in the on-state regardless the codes MNCODE<0:N> just like the second pull-down resistor unit 624 and the third pull-down resistor units 625 and 626 are provided in the pull-down termination impedance unit 340, the resolution of the pull-down termination impedance unit 340 is increased. This is because the resistors being in the on-state regardless of the codes MNCODE<0:N> can prevent the rapid change of the total impedance of the pull-down termination impedance unit even though the codes MNCODE<0:N> change.

When using the termination impedance units 330 and 340 illustrated in FIG. 6, the conventional calibration circuit (see FIG. 1) may be used without modification. The impedance of the reference impedance units in the calibration circuit (see FIG. 1) has only to be tuned according to the increase of the resistor units that are always in the on-state without regard to the codes.

Figure 7:
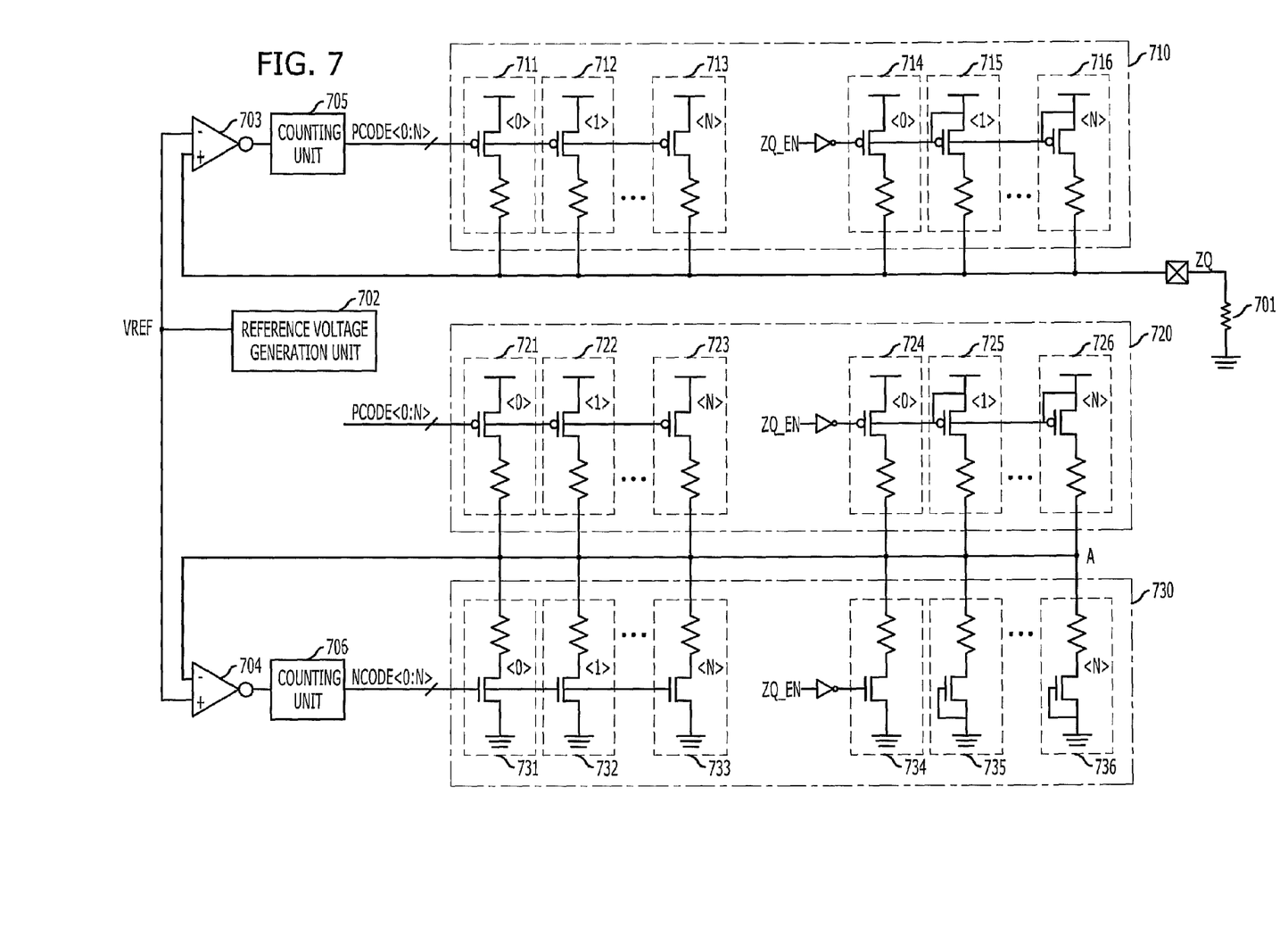
FIG. 7 is a circuit diagram of a calibration circuit that can be further matched when the termination impedance units of FIG. 6 are used.

FIG. 7 is a circuit diagram of the calibration circuit 310 that can be further matched when the termination impedance units of FIG. 6 are used.

Referring to FIG. 7, the calibration circuit 310 includes a pull-up reference impedance unit 710, a dummy reference impedance unit 720, and a pull-down reference impedance unit 730. The pull-up reference impedance unit 710 is calibrated to have the same impedance as an external resistor 701 connected to a calibration node ZQ. The dummy reference impedance unit 720 is designed to have the same configuration as the pull-up reference impedance unit 710. The pull-down reference impedance unit 730 is calibrated to have the same impedance as the dummy reference impedance unit 720. However, unlike the prior art, the internal structures of the reference impedance units 710, 720 and 730 are modified.

The pull-up reference impedance unit 710 includes a plurality of first pull-up resistor units 711 to 713, a second pull-up resistor unit 714, and one or more third pull-up resistor units 715 and 716. The first pull-up resistor units 711 to 713 are turned-on/off according to the pull-up impedance calibration codes PCODE<0:N>. The second pull-up resistor unit 714 maintains an on-state in the calibration operation. The third pull-up resistor units 715 and 716 maintain an off-state. That is, compared with the conventional pull-up reference impedance unit (110 in FIG. 1), the pull-up reference impedance unit 710 further includes the second pull-up resistor unit 714 and the third pull-up resistor units 715 and 716.

The second pull-up resistor unit 714 maintains the on-state in the calibration operation (the operation of generating the impedance calibration codes). That is, the second pull-up resistor unit 714 performs the operation corresponding to the second pull-up resistor unit 614 of the pull-up termination impedance unit 310 illustrated in FIG. 6. In FIG. 7, the signal ZQ_EN is a signal that maintains a high state during the calibration operation of generating the impedance calibration codes PCODE<0:N> and NCODE<0:N>. The third pull-up resistor units 715 and 716 maintain an off-state. The third pull-up resistor units 715 and 716 have the structure corresponding to the third pull-up resistor units 615 and 616 of the pull-up termination impedance unit 310. Since the total impedance of the pull-up termination impedance unit 310 changes according to the impedance setting information PU_60 and PU_40, the third pull-up resistor units 615 and 616 performs the on/off operation. However, in the case of the pull-up reference impedance unit 710, the target impedance need not be changed. Therefore, the third pull-up resistor units 715 and 716 maintain an off-state. That is, the third pull-up resistor units 715 and 716 are provided for making the pull-up reference impedance unit 710 have the same configuration as the pull-up termination impedance unit 310.

Since the dummy reference impedance unit 720 has the same configuration as the pull-up reference impedance unit 710, its description will be omitted.

The pull-down reference impedance unit 730 includes a plurality of first pull-down resistor units 731 to 733, a second pull-down resistor unit 734, and one or more third pull-down resistor units 735 and 736. The first pull-down resistor units 731 to 733 are turned-on/off according to the pull-down impedance calibration codes NCODE<0:N>. The second pull-down resistor unit 734 maintains an on-state in the calibration operation. The third pull-down resistor units 735 and 736 maintain an off-state. That is, compared with the conventional pull-down reference impedance unit (130 in FIG. 1), the pull-down reference impedance unit 730 further includes the second pull-down resistor unit 734 and the third pull-down resistor units 735 and 736.

The second pull-down resistor unit 734 maintains the on-state during the calibration operation, and performs the operation corresponding to the second pull-down resistor unit 624 of the pull-down termination impedance unit 340 illustrated in FIG. 6. The third pull-down resistor units 735 and 736 maintain the off-state. Hence, the pull-down reference impedance unit 730 has the same layout as the pull-down termination impedance unit 340.

The reference impedance units 710, 720 and 730 of the calibration circuit 310 of FIG. 7 have the same layout as the termination impedance units 330 and 340 of FIG. 6. Therefore, even though the termination impedance units 330 and 340 are embodied in the same structure of FIG. 6, the mismatch between the termination impedance units 330 and 340 and the reference impedance units 710, 720 and 730 is minimized.

Since the calibration circuit of FIG. 7 operates in the same manner as the conventional calibration circuit of FIG. 1, except that the internal configuration of the reference impedance units 710, 720 and 730 is modified, its further detailed description will be omitted.

In the termination circuit and the impedance matching device including the same in accordance with the embodiments of the present invention, even though one termination impedance unit is used, various termination impedances can be provided by the method of multiplying the impedance calibration codes. Consequently, the entire circuit area can be significantly reduced.

Moreover, since the number of the termination impedance units is substantially reduced, capacitance component at the interface node (pad) is reduced, thereby improving the performance of the chip.

While the present invention has been described with respect to the specific embodiments, it will be apparent to those skilled in the art that various changes and modifications may be made without departing from the spirit and scope of the invention as defined in the following claims.

What is claimed is:

1. An impedance matching device, comprising:
   a calibration circuit configured to generate impedance calibration codes for calibration of impedance;
   a code modification unit configured to modify the impedance calibration codes according to impedance setting information and output modified impedance calibration codes; and
   a termination impedance unit configured to terminate an interface node with impedance determined according to the modified impedance calibration codes,
   wherein, the termination impedance unit comprises:
   a plurality of first resistor units configured to be turned-on/off according to the modified impedance calibration codes when a termination operation is enabled;
   a second resistor unit configured to maintain an on-state when the termination operation is enabled; and
   one or more third resistor units configured to be turned-on/off according to the impedance setting information when the termination operation is enabled,
   wherein the first to third resistor units are connected in parallel to the interface node.

2. The impedance matching device of claim 1, wherein the code modification unit is configured to multiply the impedance calibration codes according to the impedance setting information.

3. The impedance matching device of claim 2, wherein the code modification unit comprises:
   one or more multipliers configured to multiply the impedance calibration codes by different multiplication factors; and
   a multiplexer configured to select one of output codes of the multipliers and the impedance calibration codes in response to the impedance setting information and output the modified impedance calibration codes.

4. The impedance matching device of claim 2, wherein the termination impedance unit is configured to determine an enabling of the termination operation in response to a termination enable signal.

5. The impedance matching device of claim 1, wherein the calibration circuit comprises a reference impedance unit configured to be calibrated to have the same impedance as an external resistor connected to a calibration node, and
the reference impedance unit comprises:
a plurality of first resistor units configured to be turned-on/off according to the impedance calibration codes;
a second resistor unit configured to maintain an on-state during a calibration operation; and
one or more third resistor units configured to maintain an off-state.

6. A termination circuit, comprising:
a code modification unit configured to modify impedance calibration codes according to impedance setting information and output modified impedance calibration codes; and
a termination impedance unit configured to terminate an interface node with impedance determined according to the modified impedance calibration codes,
wherein the termination impedance unit comprises:
a plurality of first resistor units configured to be turned-on/off according to the modified impedance calibration codes when a termination operation is enabled;
a second resistor unit configured to maintain an on-state when the termination operation is enabled; and
one or more third resistor units configured to be turned-on/off according to the impedance setting information when the termination operation is enabled,
wherein the first to third resistor units are connected in parallel to the interface node.

7. The termination circuit of claim 6, wherein the code modification unit is configured to multiply the impedance calibration codes according to the impedance setting information.

8. The termination circuit of claim 7, wherein the code modification unit comprises:
one or more multipliers configured to multiply the impedance calibration codes by different multiplication factors; and
a multiplexer configured to select one of output codes of the multipliers and the impedance calibration codes in response to the impedance setting information and output the modified impedance calibration codes.

9. An output driver, comprising:
a code modification unit configured to modify pull-up impedance calibration codes and pull-down impedance calibration codes according to impedance setting information and output modified pull-up impedance calibration codes and modified pull-down impedance calibration codes;
a pull-up driver enabled when first logic level data is outputted, and configured to terminate an interface node with impedance determined according to the modified pull-up impedance calibration codes; and
a pull-down driver enabled when second logic level data is outputted, and configured to terminate the interface node with impedance determined according to the modified pull-down impedance calibration codes,
wherein the pull-up driver comprises:
a plurality of first pull-up resistor units configured to be turned-on/off according to the modified pull-up impedance calibration codes when a first logic level data is outputted;
a second pull-up resistor unit configured to maintain an on-state when the first logic level data is outputted; and
one or more third pull-up resistor units configured to be turned-on/off according to the pull-up impedance setting information when the first logic level data is outputted,
wherein the first to third pull-up resistor units are connected in parallel to the interface node,
wherein the pull-down driver comprises:
a plurality of first pull-down resistor units configured to be turned-on/off according to the modified pull-down impedance calibration codes when a second logic level data is outputted;
a second pull-down resistor unit configured to maintain an on-state when the second logic level data is outputted; and
one or more third pull-down resistor units configured to be turned-on/off according to the pull-down impedance setting information when the second logic level data is outputted,
wherein the first to third pull-down resistor units are connected in parallel to the interface node.

10. The output driver of claim 9, wherein the code modification unit is configured to multiply the pull-up impedance calibration codes and the pull-down impedance calibration codes according to the impedance setting information.

11. The output driver of claim 10, wherein the code modification unit comprises:
one or more first multipliers configured to multiply the pull-up impedance calibration codes by different multiplication factors;
a first multiplexer configured to select one of output codes of the first multipliers and the pull-up impedance calibration codes in response to pull-up impedance setting information and output the modified pull-up impedance calibration codes;
one or more second multipliers configured to multiply the pull-down impedance calibration codes by different multiplication factors; and
a second multiplexer configured to select one of output codes of the second multipliers and the pull-down impedance calibration codes in response to pull-down impedance setting information and output the modified pull-down impedance calibration codes.

* * * * *